(12) United States Patent
Kawabata

(10) Patent No.: US 7,447,992 B2
(45) Date of Patent: Nov. 4, 2008

(54) METHOD OF PRODUCING PUBLICATIONS, ELECTRONIC PUBLICATION PRODUCED BY THE METHOD, AND METHOD AND NETWORK SYSTEM FOR DISPLAYING THE ELECTRONIC PUBLICATION

(75) Inventor: Hideki Kawabata, Tokyo (JP)

(73) Assignee: E Media Ltd., Tokyo (JP)

( * ) Notice: Subject to any disclaimer, the term of this patent is extended or adjusted under 35 U.S.C. 154(b) by 141 days.

(21) Appl. No.: 10/344,571

(22) PCT Filed: Aug. 13, 2001

(86) PCT No.: PCT/JP01/06986

§ 371 (c)(1),
(2), (4) Date: Apr. 7, 2003

(87) PCT Pub. No.: WO02/15043

PCT Pub. Date: Feb. 21, 2002

(65) Prior Publication Data

US 2004/0047510 A1    Mar. 11, 2004

(30) Foreign Application Priority Data

Aug. 17, 2000    (JP)    ............... 2000-247744

(51) Int. Cl.
  *G06F 17/00*    (2006.01)
(52) U.S. Cl. .............. 715/243; 715/251; 715/253; 358/1.18; 705/26
(58) Field of Classification Search .......... 715/500, 715/839, 776, 522, 517, 525, 526, 530, 500.1, 715/200, 203, 205, 243–253, 255, 273; 345/156, 345/660, 901; 358/1.18; 705/26

See application file for complete search history.

(56) References Cited

U.S. PATENT DOCUMENTS

| 5,237,651 | A | * | 8/1993 | Randall | 715/776 |
| 5,251,294 | A | * | 10/1993 | Abelow | 715/512 |
| 5,417,575 | A | * | 5/1995 | McTaggart | 434/317 |
| 5,463,725 | A | * | 10/1995 | Henckel et al. | 715/776 |
| 5,467,102 | A | * | 11/1995 | Kuno et al. | 345/1.3 |

(Continued)

FOREIGN PATENT DOCUMENTS

JP    A 8-106469    4/1996

(Continued)

OTHER PUBLICATIONS

Stuart K. Card, George G. Robertson William York, "The WebBook and the Web Forager: An Information Workspace for the World-Wide Web." In Human Factors in Computing Systems: Proceedings of the CHI '96 Conference. New York: ACM, 1996.*

Primary Examiner—Doug Hutton
Assistant Examiner—James H Blackwell
(74) Attorney, Agent, or Firm—Oliff & Berridge, PLC

(57) ABSTRACT

Methods for producing publications are described that may include displaying an image of a publication, reading raster image data by page to be linked on the publication, superimposing raster image data selected on the basis of link information on an image of a page in the publication selected, varying the image of the publication through an image transformation process on the basis of screen transit operation information, and producing a publication by associating the selected page with raster image data for the selected page.

19 Claims, 12 Drawing Sheets

U.S. PATENT DOCUMENTS

| | | | |
|---|---|---|---|
| 5,761,485 A * | 6/1998 | Munyan | 715/839 |
| 5,774,363 A | 6/1998 | Sato et al. | 700/97 |
| 5,900,876 A * | 5/1999 | Yagita et al. | 715/776 |
| 5,956,034 A * | 9/1999 | Sachs et al. | 715/776 |
| 6,026,417 A * | 2/2000 | Ross et al. | 715/517 |
| 6,044,384 A * | 3/2000 | Ishima et al. | 715/517 |
| 6,078,005 A | 6/2000 | Kurakake et al. | 84/477 R |
| 6,081,262 A * | 6/2000 | Gill et al. | 715/500.1 |
| 6,084,553 A * | 7/2000 | Walls et al. | 715/781 |
| 6,088,710 A * | 7/2000 | Dreyer et al. | 715/517 |
| 6,175,841 B1 * | 1/2001 | Loiacono | 715/512 |
| 6,199,082 B1 * | 3/2001 | Ferrel et al. | 715/522 |
| 6,205,452 B1 * | 3/2001 | Warmus et al. | 715/500 |
| 6,332,149 B1 * | 12/2001 | Warmus et al. | 715/517 |
| 6,340,980 B1 * | 1/2002 | Ho | 715/776 |
| 6,407,757 B1 * | 6/2002 | Ho | 715/776 |
| 6,415,307 B2 * | 7/2002 | Jones et al. | 715/525 |
| 6,486,890 B1 * | 11/2002 | Harada et al. | 345/660 |
| 6,486,895 B1 * | 11/2002 | Robertson et al. | 715/776 |
| 6,544,294 B1 * | 4/2003 | Greenfield et al. | 715/526 |
| 6,650,343 B1 * | 11/2003 | Fujita et al. | 715/760 |
| 6,690,337 B1 * | 2/2004 | Mayer et al. | 345/1.1 |
| 2001/0047373 A1 * | 11/2001 | Jones et al. | 707/515 |
| 2004/0201569 A1 * | 10/2004 | Seet et al. | 345/156 |
| 2004/0205655 A1 * | 10/2004 | Wu | 715/530 |

FOREIGN PATENT DOCUMENTS

| | | |
|---|---|---|
| JP | A 9-265470 | 10/1997 |
| JP | A 10-154185 | 6/1998 |
| JP | A 10-171093 | 6/1998 |
| JP | A 2000-148744 | 5/2000 |
| WO | WO 97/37484 | 10/1997 |

* cited by examiner

ENLARGED VIEW

METHOD OF PRODUCING PUBLICATIONS, ELECTRONIC PUBLICATION PRODUCED BY THE METHOD, AND METHOD AND NETWORK SYSTEM FOR DISPLAYING THE ELECTRONIC PUBLICATION

TECHNICAL FIELD

The present invention relates to a method of producing publication for the purpose of an effective use of raster image data created through production processes of printed publications. It also relates to an electronic publication produced by the method, and a method and network system for displaying the electronic publication. More particularly, the present invention relates to a user interface for use in a link process of character information, still picture information, motion picture information and audio information by page.

BACKGROUND ART

As the recent digitalization proceeds, remarkable developments can be found also in a production process of printed publications. For example, a prepress (hereinafter referred to an "PP") process capable of providing films and machine plates directly from digital data with no block copy process can be performed with a DTP (Desk Top Publishing) technology, and a plate making process with a CTP (Computer to Plate) technology. In particular, the development of DTP brings about change. It shifts operations of image processing in the PP process such as design, block copy and reproduction up to higher operations of image processing while it facilitates the entire production process of printed publications to be simplified. In addition, the development of CTP can save resources such as films for plate making by using method that film outputs to be the final products from the PP process are directly output as digital plate making data. Further, the generation already started, where a shift from the PP process to a direct press process begins to realize an effect to facilitate rationalization of plate making and press process.

In such the tendency on the digitalization of the printed publication production processes, the digitalization of the PP process is particularly remarkable and, currently, the DTP system is most widely employed.

The PP system comprises a DTP system, a RIP (Raster Image Processor) and its output devices. The PP system is configured to totally edit/output characters, images and so forth. A plate making system for press is configured to produce a machine plate based on plate making data output from the PP system.

The DTP system comprises a personal computer (hereinafter referred to as "PC") or a workstation (hereinafter referred to as "WS"), which employs DTP application software inside. The RIP creates raster image data based on the data produced in the DTP application software. The PP system further comprises a storage device such as a hard disc and/or MO drive to store the raster image data from the RIP. An imposition processor turns the image data from the PP system into imposition data allocated for constructing pages of a book. The imposition data created at the imposition processor is sent to a plate making system for press, which employs it as plate making data, for example.

When an operator, for example, a graphic designer employs the PC and/or WS to produce and edit characters and images. The DTP system in the PP system thus configured creates layout data. The layout data is derived from data of the characters and images and expressed with a Page Description Language (PDL) such as PostScript® from Adobe (hereinafter referred to as "PS"). The layout data is derived as a design layout per page from integration of digital data obtained from character inputs, image scanning, and drawing and illustrating operations. The layout data is converted at the RIP into raster image data in a bitmap or run-length format (image data).

A link processor turns the raster image data created at the RIP into imposition data that includes the raster image data linked on each page in a state printable on a printing. This imposition data is output on a film through an image setter. This mode corresponds to a process, so-called "imposition process after RIP". To the contrary, there is another process, so-called "imposition process before RIP", which is employed to first perform an imposition process for layout data per page and then, after converting into raster image data, output it on a film through an image setter. It is disadvantageous, however, that the "imposition process before RIP" requires useless press materials and work hours when a problem occurs in proofreading because the imposition data must be modified again from the stage of DTP application software, for example.

In the link processor, similar to a method of assigning pages in a publication as disclosed in JP 10-319567A, front and back surfaces of a page are displayed on a leaf. Then, a direction and size of raster image data by page is determined so as to achieve a correct bookbinding when folding and cutting processes are performed. Thus, image data on each page is allocated one by one to produce imposition data. In addition, similar to an apparatus for displaying prints as disclosed in JP 9-185606A, produced imposition data is displayed in the form of an actual book, prior to outputting it from an image setter, to confirm if a desired layout can be obtained before printing. The image setter outputs raster image data on a press material based on the imposition data to produce a reproduction film.

The RIP in the conventional PP system is connected to the image setter at 1-to-1 (so-called "1-RIP/1-OUT" mode). To the contrary, recently, the raster image data from the RIP can b taken out as a TIFF format file that is one of general image files. Therefore, the RIP can be connected, in addition, to th image setter, to a plurality of output devices (such as color printer, reproduction film output machines and CRT output devices) so as to output the raster image data from the RIP in various formats (so-called "1-RIP/multi-OUT" mode).

In such the systems described above, however, even though the TIFF format data can be taken out of the RIP in the PP system at great pains and the plurality of output devices can employ it, the raster image data is hardly employed effectively, in practice for other uses. Because the layout data produced in the DTP system with much tine and work is basically a one-off product that is different from one an ther. Therefore, from the first, it is not considered to divert the raster image data produced in the RIP based on the layout data in other ways. In addition, the use of the raster image data is delayed in other fields and industries due to such problems as data exchange. In most cases, the raster image data is left being saved and accumulated in a storage device or medium. Otherwise, it is deleted as such in practice. Further, such the raster image data that is assumed to be employed for printed publications has too small original characters and so forth to apply as such to electronic publications because the characters and so forth cannot be identified visibly. This is a disadvantage because it interferes with the effective operation of information resources.

DISCLOSURE OF INVENTION

The present invention has been made in consideration of the above disadvantages and accordingly has an object to provide a method of producing publications, electronic publication produced by the method, and method and network system for displaying the electronic publication. In the present invention, a user interfaces applied to utilized raster image data effectively and to create imposition data through an accurate imposition process by simplifying a link process.

The present invention is provided with a method of producing publications, comprising the steps of: displaying an image of a publication; varying the image of the publication through an imag transformation process on the basis of screen transit operation information; reading raster image data by page to be linked (layout) on the publication; superimposing raster image data selected on the basis of link information on an image of a page in the publication selected on the basis of the screen transit operation information; and producing a publication from association of the selected page with raster image data for the selected page.

Preferably, to improve reality, the screen transit operation information may comprise page flipping (or paging) information and the image transformation process may comprise a page flipping (or paging) process. Though, they may be such screen transit operation information and image transformation process that realize screen transients including lateral and vertical drawing, fade in and fade out.

The publications herein described mean the whole paper booklets (printed matters) such as books, catalogs, brochures, ads, manuals and albums and the whole electrified booklets (electronic publications). Preferably, the raster image data by page may comprise raster image data output from a raster image processor in a print process or raster image data taken from an imaging device such as a scanner and a camera.

The raster image data per page comprises first image data having a certain resolution and second image data to be linked thereto. The second image data has a different resolution from that of the first image data (for example, a lower resolution than that of the first image data). Preferably, the raster image data to be superimposed on the image of the page selected in the publication may comprise the second image data.

The step of producing may include the step of producing a printing using the first image data.

Preferably, the publication may comprise an electronic publication.

Preferably, the method may further comprise the step of reading at least one of motion picture information, audio information and command information to be linked to the publication.

More preferably, the method may yet further comprise the step of recording the electronic publication along with a viewer program for displaying the electronic publication in a storage medium. The viewer program contains one with an editor function capable of reediting or adding, The storage medium may be employed to record other additional information, for example, memo, date, author, product ID and license information such as copyright.

Preferably, the method may further comprise the steps of creating imposition data from association of the selected page with raster image data for the selected page; and creating a data file for reproduction using the first image data on the basis of the imposition data created.

In addition, preferably, the method may further comprise the steps of rating print process information while creating the imposition data; and creating a file for print proceed management from the print process information created.

The raster image data to be linked to the publication is d rived from a pag description language file created on the basis of text data in an original and converted by a raster imag processor. Preferably, the method may further comprise the steps of creating converted text data through an OCR process to the raster image data; and comparing the converted text data, an original page description language file of the raster image data and the text data of the original to correct conversion errors occurred on the OCR process, obtaining disposal information of each character in the raster image data, and comparing differences between raster image data of first and second revises from the disposal information to check digital data. It is also possible to compare differences between raster image data of second and third revises.

Preferably, the method may further comprise the step of linking, on the basis of the link information, to an image on a page in the publication selected on the basis of the page flipping information, at least one of motion picture information, audio information and command information corresponding to raster image data to be linked to that page.

The present invention is also provided with a medium having a program recorded therein for executing a method of producing publications having the above characteristic.

The present invention is further provided with an electronic publication obtained from execution of a method of producing publications having the above characteristic.

The present invention is yet further provided with a method of displaying, comprising the steps of displaying an image of an electronic publication obtained from execution of a method of producing publications having the above characteristic; and applying an image transformation process to the image of the publication on the basis of screen transit operation information.

The present invention is provided with a method of displaying, comprising the steps of: displaying an image of an electronic publication obtained from execution of a method of producing publications having the above characteristic; and varying the image of the publication with a copy of page flipping corresponding to a sheet thickness of the publication on the basis of the page flipping information.

The present invention is also provided with a method of displaying, comprising the steps of: displaying an image of an electronic publication obtained from execution of a method of producing publications having the above characteristic; designating an area to be enlarged and displayed within the image of the publication displayed; and enlarging and displaying the image in the area designated.

The present invention is further provided with a method of displaying, comprising the steps of displaying an image of an electronic publication produced using raster image data output from a raster image processor in a print process; designating an area to be enlarged and displayed within the image of the publication displayed; and enlarging and displaying the image in the area designated.

The present invention is yet further provided with a network system comprising one or more host computer(s) and a plurality of client computers, connected to each other via a network, for loading from a storage medium an electronic publication produc d by the above method of producing publications and displaying an image of the publication having rester image data assigned to each page. The host computer(s)

and the client computers via the network mutually transfer information of a page in the publication displayed or to be displayed at the client computers. The host computer(s) reduces and displays an image of the page in the publication displayed or to be displayed at the client computers in a line. In this case the reduced image may be enlarged to display.

The present invention is provided with a method of delivering publications, comprising the steps of: delivering an electronic publication in response to a delivery request given from a network; and delivering a viewer program for displaying the electronic publication in response to a delivery request given from a network. The present invention is also provided with a method of delivering publications, comprising the step of delivering the electronic publication and/or a viewer program for displaying the electronic publication via a network such as a data delivery and a broadcast.

According to the present invention, it is possible to link not only raster image data but also character, still picture, motion picture and audio information to each page of images displayed in the form of an actual publication. It is also possible to create imposition data at the same time. Therefore, the link process can be simplified. For example, it is possible to easily confirm a situation of link data arranged in a state of double-page spread and to easily link an image and s forth crossing over a double-page spread. When a link process is performed to a page, an imposition process per page is performed at the same time. Therefore, a publication can be produced in a reduced operation, and thus errors and costs for production of publications can be reduced. Accordingly, the link data and imposition data created in the production process of the publication can be employed to produce another publication with an effective use of data and a suppressed publication production cost.

When an electronic publication is employed among those publications in a network system, for example, host and client computers, which display images of the publication, can mutually transfer page information of the publication via the network using any protocol. The host computer can display, based on the transferred page information, the images of the pages in the publications displayed or to be displayed on a plurality of client computers, in a manner of reduced and arranged in a line. Therefore, one or more host computers can communicate with a plurality of client computers in a bi-directional mode at the same time. In addition, the one or more host computers can control and confirm the plurality of client computers at the same time.

BEST MODE FOR CARRYING OUT THE INVENTION

Preferred embodiments of the present invention will be described below with reference to the accompanying drawings.

Figure 1:
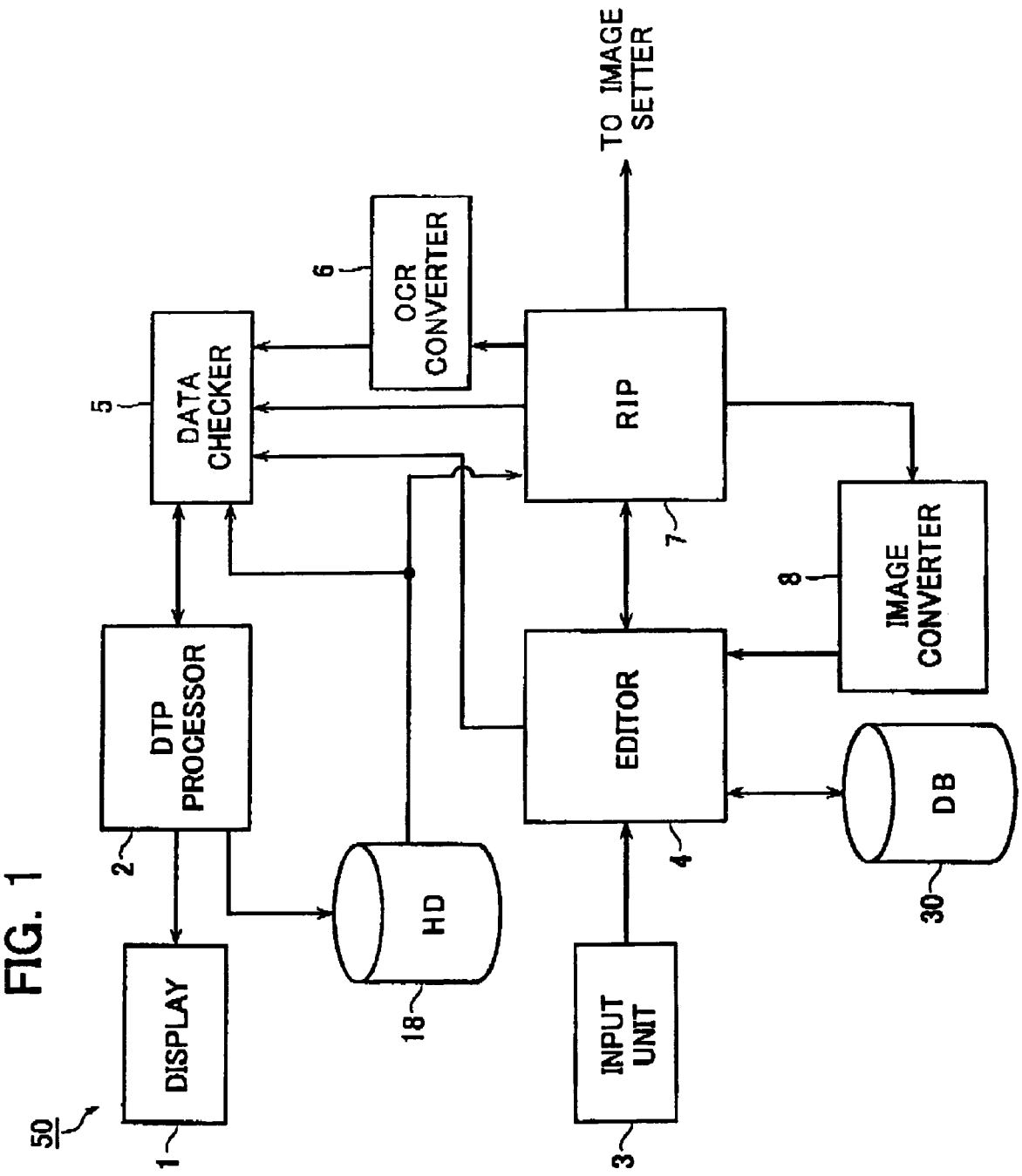
FIG. 1 is a block diagram schematically showing an arrangement of a system for producing publication to realize a method of producing publications according to an embodiment of the present invention.

FIG. 1 is a block diagram schematically showing an arrangement of a system for producing publications to realize a method of producing publications according to an embodiment of the present invention.

The publication producing system 50 employs a general-purpose personal computer (PC) or workstation (WS), which comprises a display 1, a DTP processor 2, an input unit 3, an editor 4, a data checker 5, an OCR converter 6, a RIP 7, an image converter 8 and a database (DB) 30. The display 1 includes a CRT (Cathode Ray Tube) or LCD (Liquid Crystal Device) to display image information and so forth from the DTP processor 2 on the screen of the display 1. The input unit 3 includes a keyboard for entering various key inputs and a pointing device such as a mouse for positioning and pointing images and patterns on the screen of the display 1. The DTP processor 2 is a partial inner function of the PC or WS that is contained in the publication producing system 50.

Figure 2:
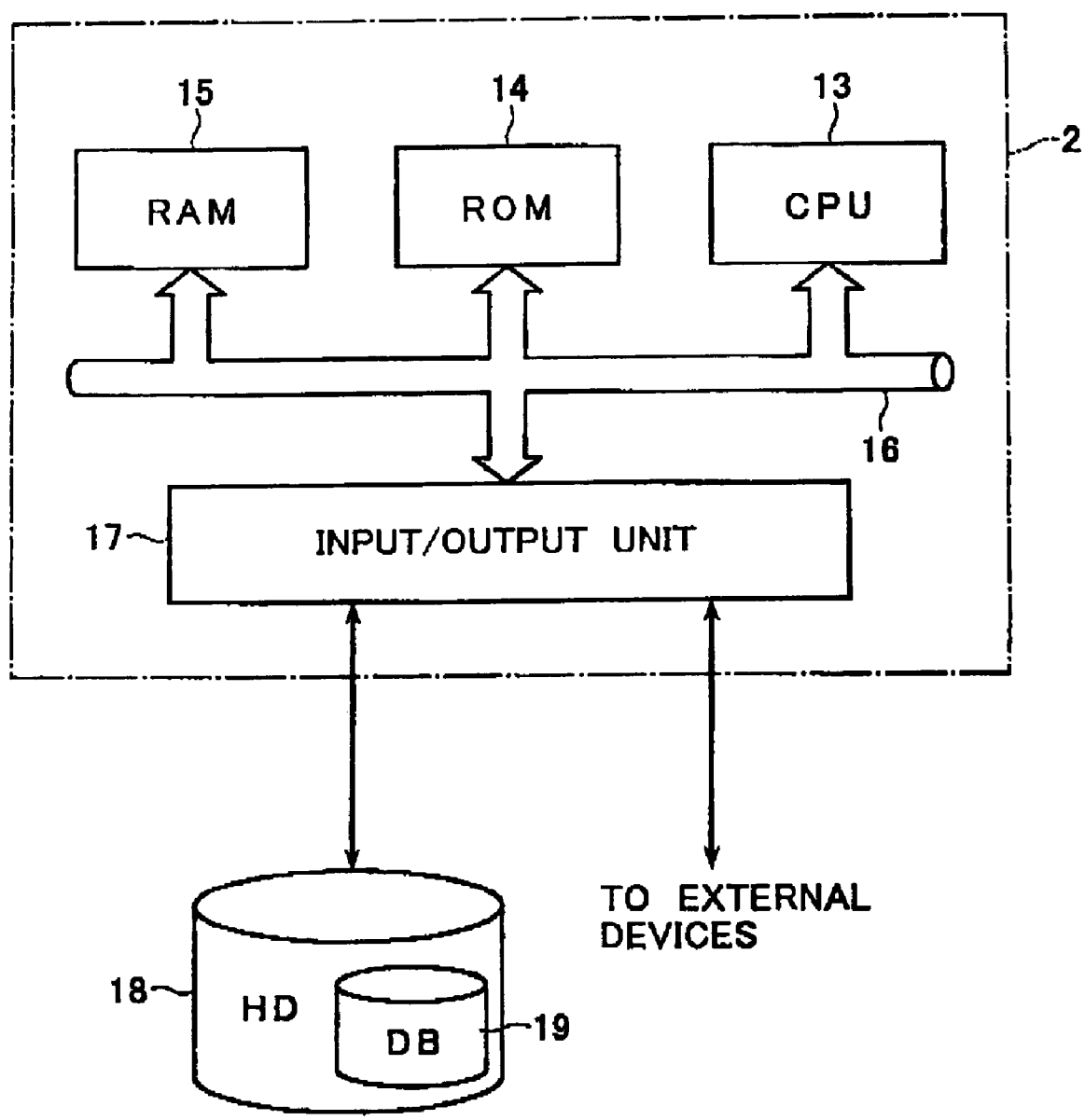
FIG. 2 is a block diagram showing the inside of a DTP processor in the above system.

The DTP processor 2 comprises, as shown in FIG. 2, a CPU 13 for operational processing, a ROM (Read Only Memory) 14 having a part of an OS (Operating System) stored therein, and a RAM (Random Access Memory) 15 to be used mainly as operational regions for the CPU 13. A bus 16 is employed to connect them. An input/output unit (I/O) 17 is connected via the bus 16 to external devices for performing data transmission and reception therewith. The DTP processor 2 is also connected via the I/O 17 to an external storage 18 that consists typically of a hard disc for storing OS and application software. The external storage 18 is employed to save information, for example, image data read by a scanner and original text data input from the keyboard. When a design operator produces or edits a layout based on the image data or text data read, the DTP processor 2 converts the produced or edited data into a PDL to create EPS (Encapsulated PostScript) layout data in a PS format, for example. The database 19 stores parameters for use in the layout data thus created at the DTP processor 2, for example.

The layout data created at the DTP processor 2 and stored in the database 19 is fed to the RIP 7, which in turn creates image data consisting of raster image data through processes of certain application software based on the layout data from the DTP processor 2. The raster image data created at the RIP 7 comprises, for example, TIFF data (first image data, hereinafter referred to as "page data") for press with a high resolution (about 350-2510 dpi). This page data is given to the editor 4, the OCR converter 6 and the image converter 8. The image converter 8 creates page data for display and thumbnail data for display with low resolutions (about 30-150 dpi) in JPEG (Joint Photographic Experts Group) format based on the page data from the RIP 7, which are supplied to the editor 4. The page data for display and thumbnail data for display configure second image data. The page data from the RIP 7 is subjected to OCR conversion at the OCR converter 6 to create converted text data and disposal information. The second image data may also be output directly from the RIP 7.

The editor 4 performs edit processes for creating reproduction data such as a link process and an imposition process on the basis of the page data from the RIP 7 and the page data for display and thumbnail data for display form the image converter 8. Further, the editor 4 creates a data file of a white page book to be displayed in the form of an actual book on the screen of the display 1 that is employed to link the created page data for display. The white page book is a book that has no contents linked thereon but may description a book in the middle of th link operation is also called the "white page book". The created data file of white page book is employed as page unit regions for link during the link operation described later and imposition data is created based on the linked data file of white page book. The page data, thumbnail data for display and page data for display are linked to each other and employed in the editor 4.

The editor 4 includes an imposition processor 20, which creates imposition data in accordance with designations from the input unit 3 with reference to data and parameters stored in the database 30. The editor 4 automatically creates a PPF (Print Production Format) file with CIP3 (International Cooperation for Integration of Prepress, Press and PostScript) standard based on print process information input from the input unit 3 and obtained during the imposition processor 20 performs an imposition process. The print process information includes a print sheet size, print ink information, folding/cutting information for a leaf, for example. The PPF file contains management information required for device controls such as processes of printing, cutting, folding and bookmaking, based on which the information management can be centralized beginning from the reproduction process.

The data checker 5 compares the converted text data from the OCR converter 6 (including disposal information) to the original text date given to the DTP processor 2 and the PS data or the RIP input to correct conversion errors occurred in the OCR conversion at the OCR converter 6. The date checker 5 utilizes the layout data created at the DTP processor 2 and the page data created at the RIP 7 in addition to the original and converted text data to analyze and obtain disposal information of each character contained in the page data. The disposal information includes page information regarding position, row and column, size and direction, for example. The data checker 5 compares raster image data of a first revise with that of a second revise based on the obtained disposal information to check digital data. The data checker 5 may further compare raster image data of the second revise with that of a third revise.

The following description is given to an inner arrangement of the editor 4.

Figure 3:
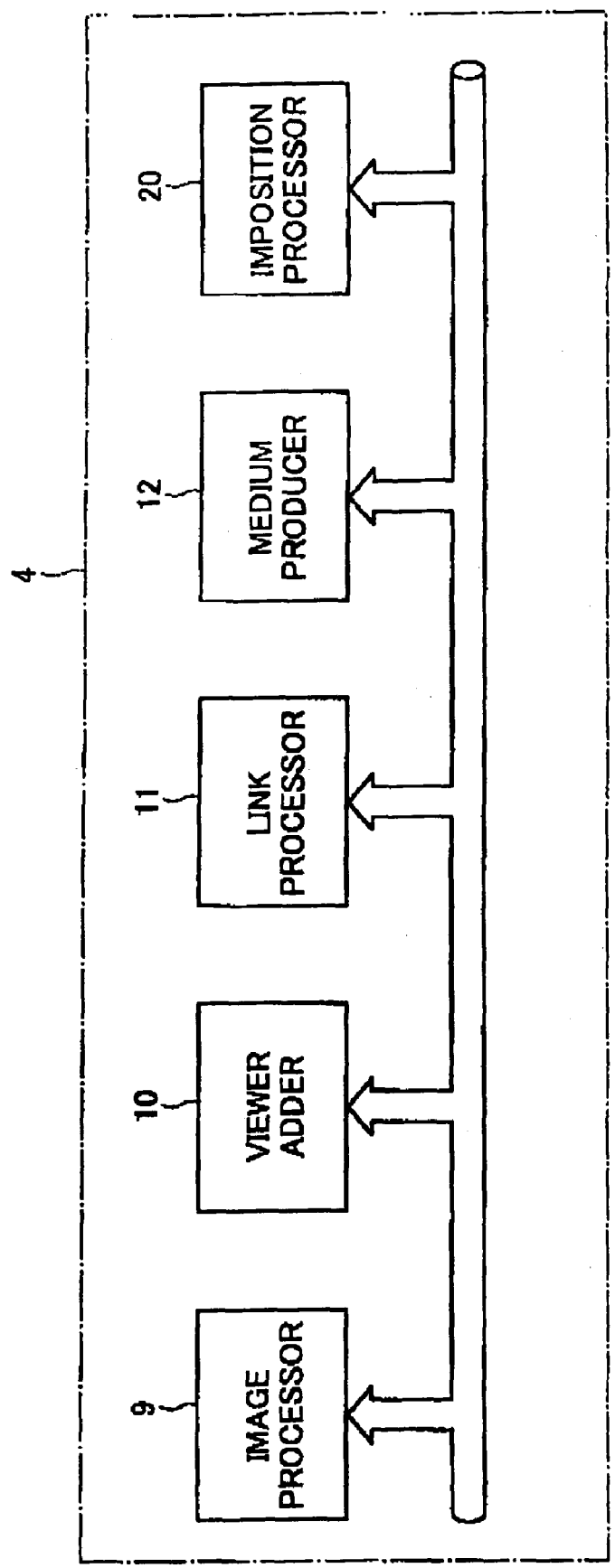
FIG. 3 is a block diagram showing a partial inner arrangement of an editor in the above system.

FIG. 3 is a block diagram showing a part of the inner arrangement of the editor 4. The editor 4 mainly comprises an image processor 9, a viewer adder 10, a link processor 11, a medium producer 12 and an imposition processor 20. The image processor 9 performs an image display process to display the above-mentioned data file of white page book on the screen of the display 1 in the form of book. The viewer adder 10 adds certain viewer application software to the data file of white page book to allow any hardware to read these in the form of a book together with the imposition data created based on the data file of white page book. The link processor 11 links a variety of information including character information, still picture information, motion picture information and audio information such as voice, music and MIDI data to each page in the data file of white page book. The medium producer 12 subjects the data file of white page book with a variety of information linked at the link processor 11 to a p0rocess of recording in storage media such an CD-ROMs and DVDs to produce these media. The imposition processor 20 produces the imposition data as described above and thus the description for it can be omitted at this stage. The editor 4 may link motion picture, audio and other data to the white pages displayed in the book image such that those data can be replayed in a synchronized (link) motion with page flipping (or paging) performed by the link processor 11 to turn the white pages in a link process.

On the basis of the data file of white page book link-processed also in the editor 4, the imposition data (the first image data) consisting of each high-resolution page data als created in the editor 4 may be output directly as a reproduction film or CTP. Alternatively, it maybe once convert a into a data file in PS format and then given to the RIP 7 again. The RIP 7creates reproduction data based on the data file in the PS format and supplies it to a later reproduction process, for example, at the image setter.

Figure 4:
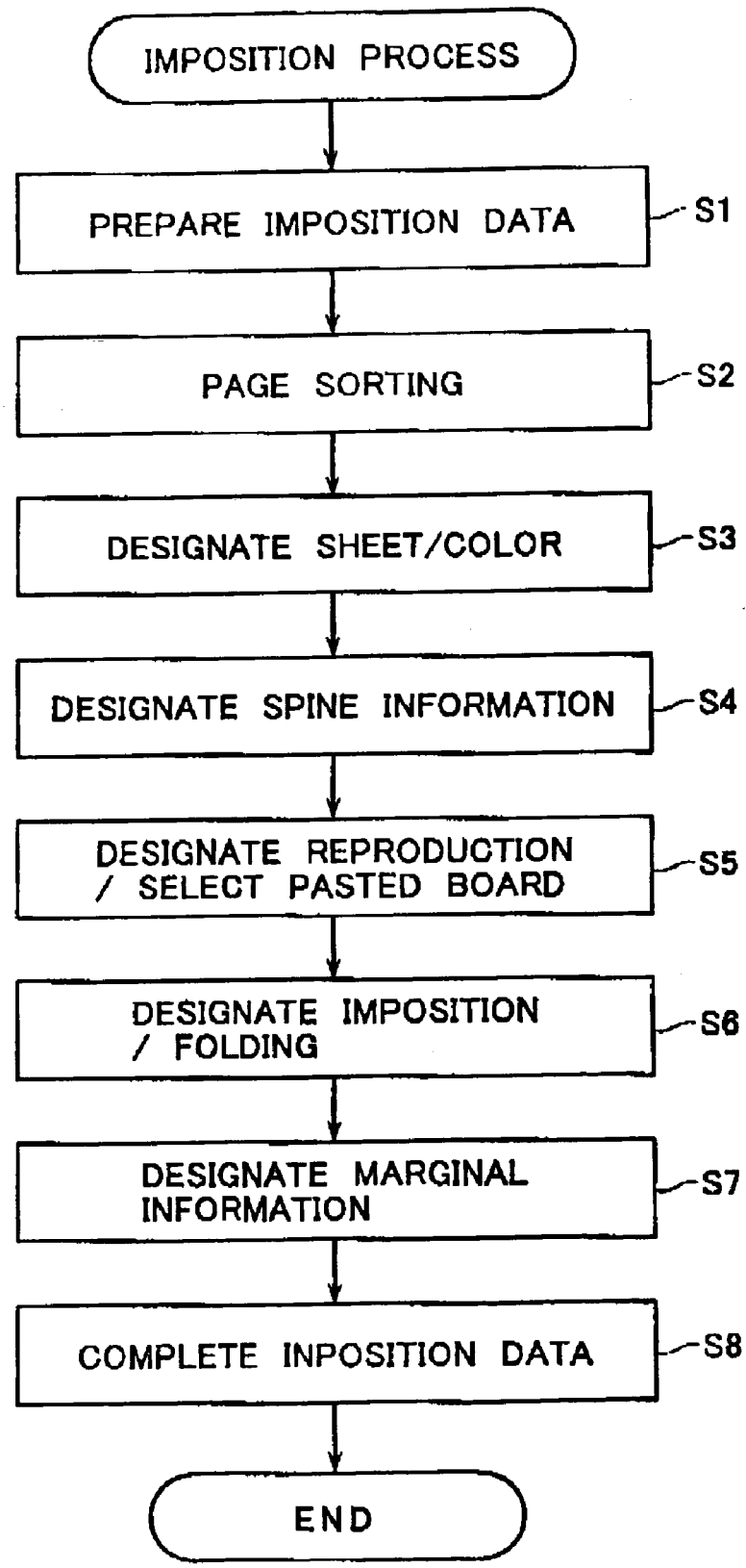
FIG. 4 is a flowchart showing an imposition process in an imposition processor in the above system.
Figure 5:
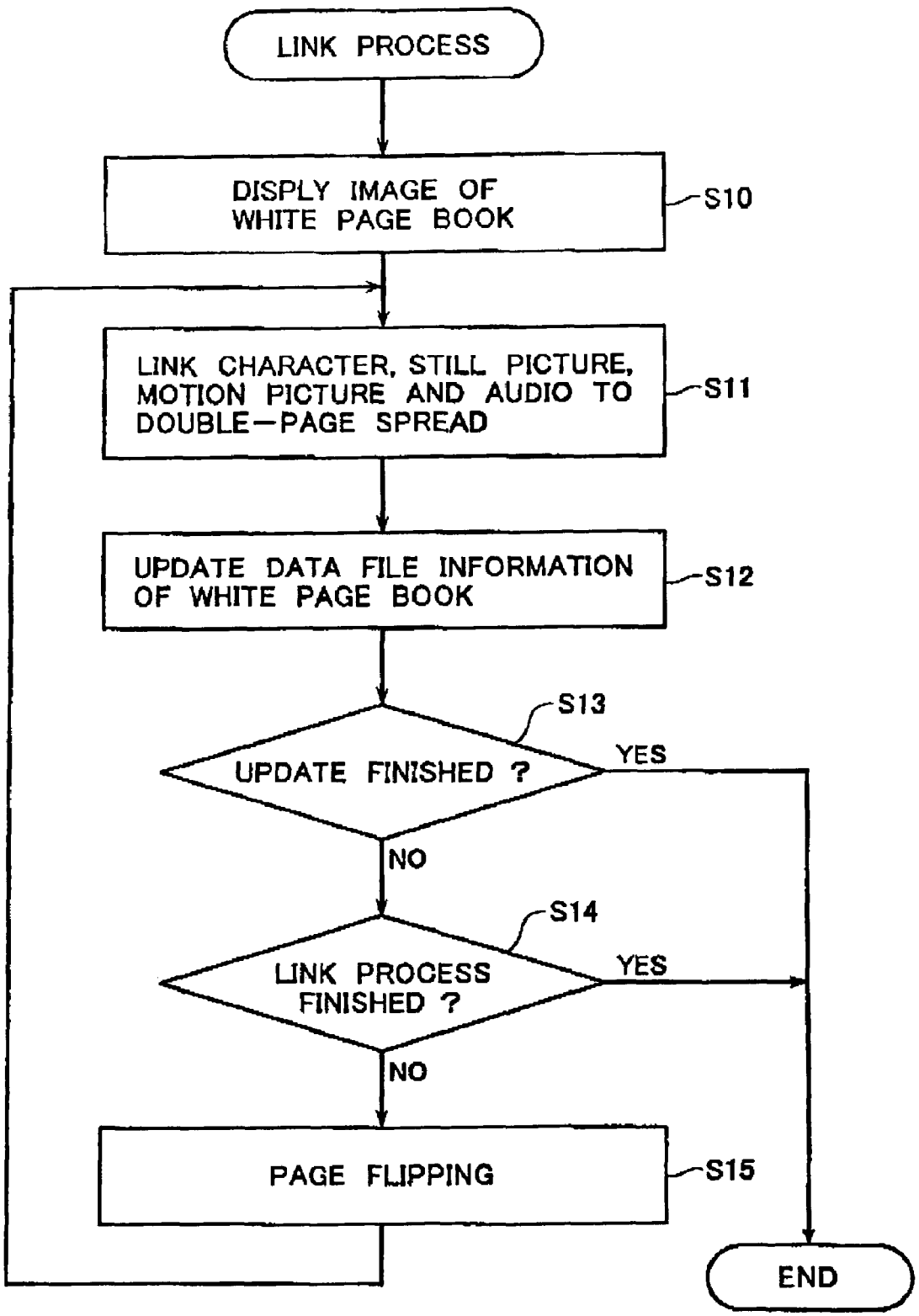
FIG. 5 is a flowchart showing a link process in a link processor in the above system.
Figure 6:
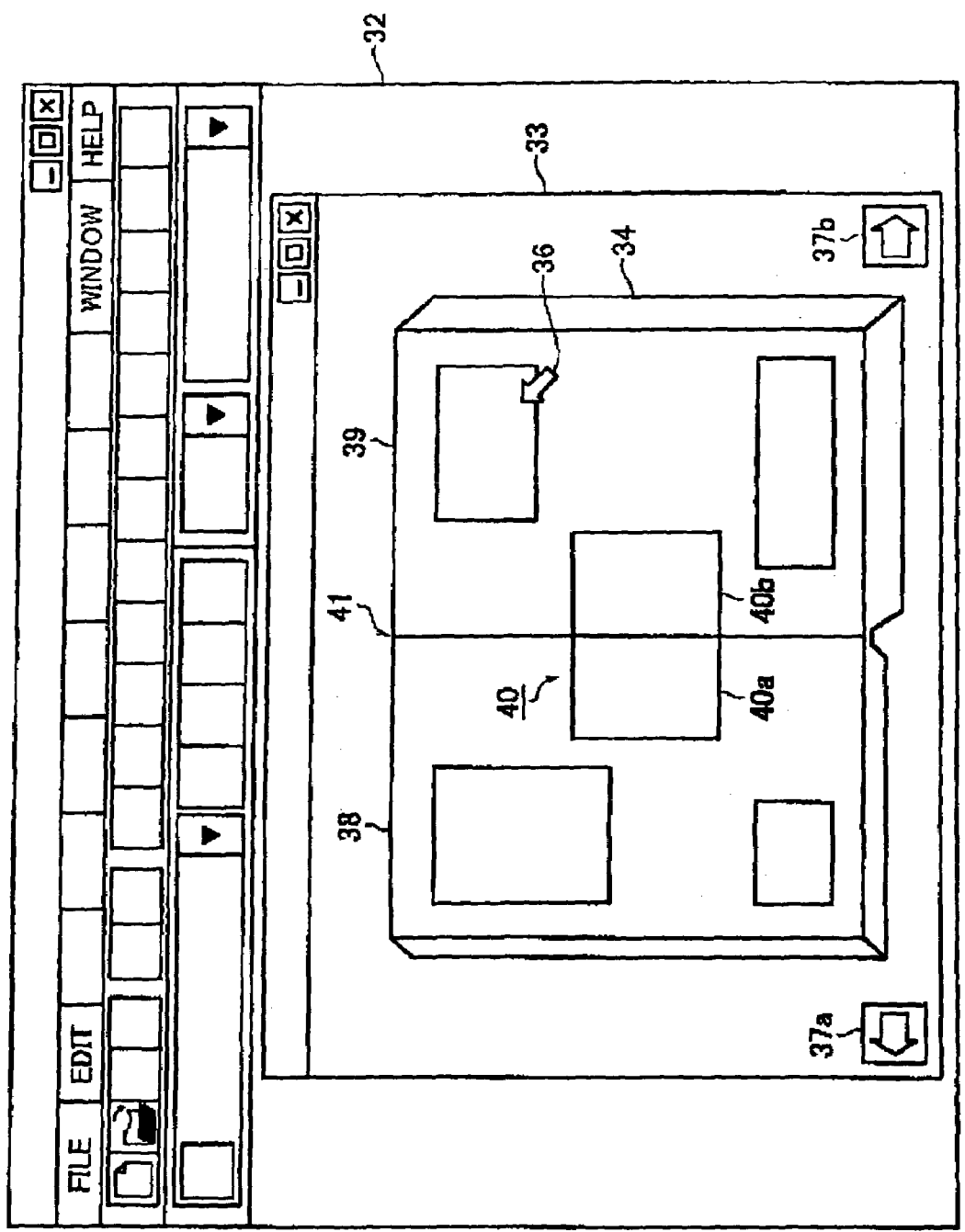
FIG. 6 illustrates a link process on a screen of a display device in the above system.
Figure 7:
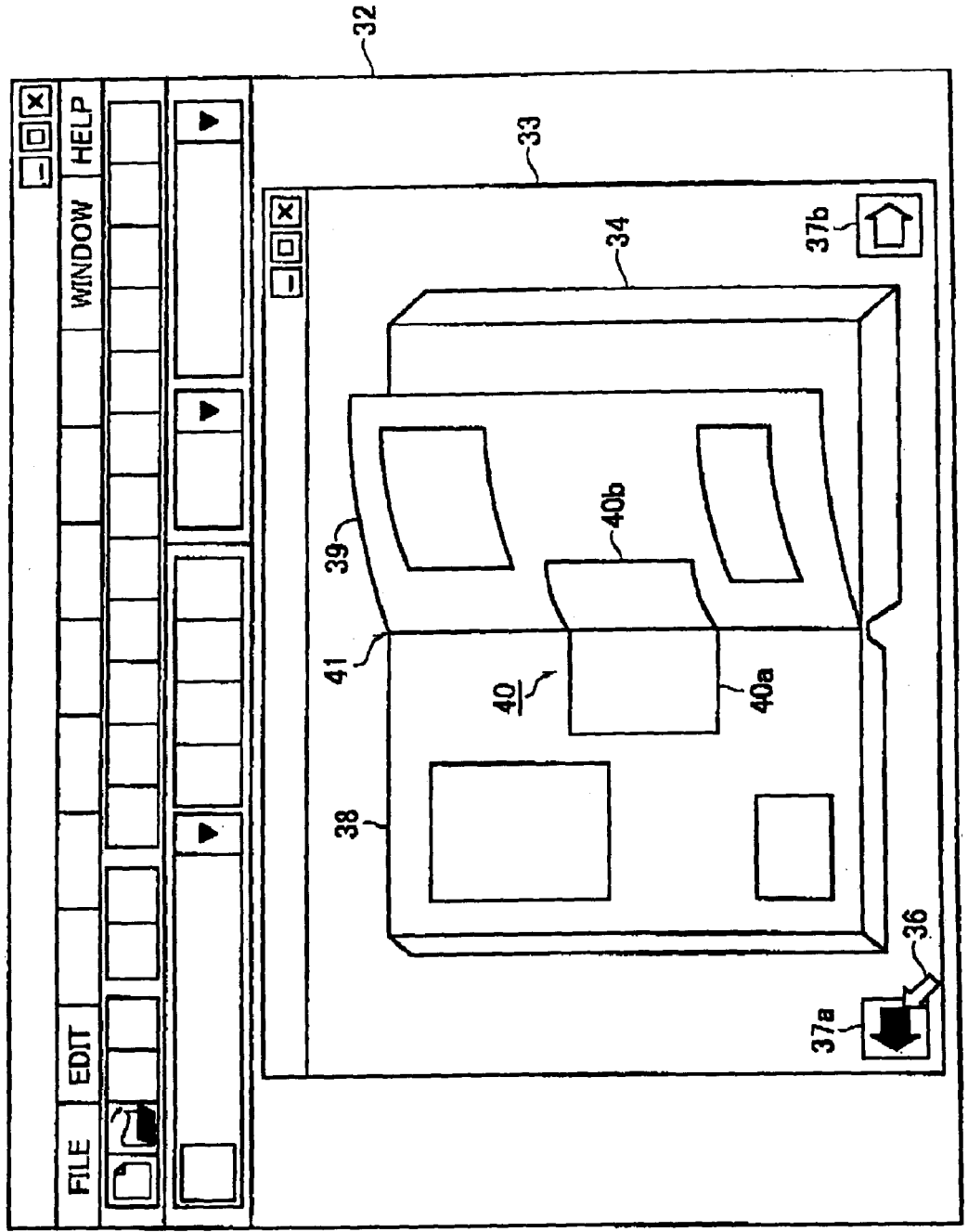
FIG. 7 illustrates page flipping after the link process in FIG. 6.
Figure 8:
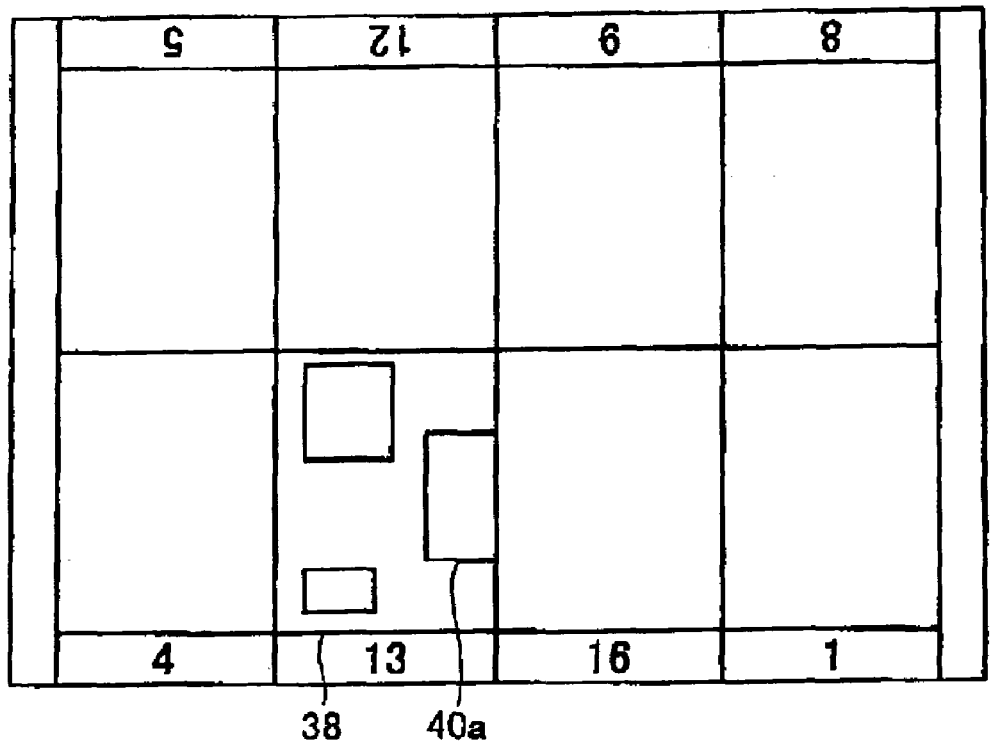
FIG. 8 illustrates imposition data created in association with the link process in the imposition processor.
Figure 8:
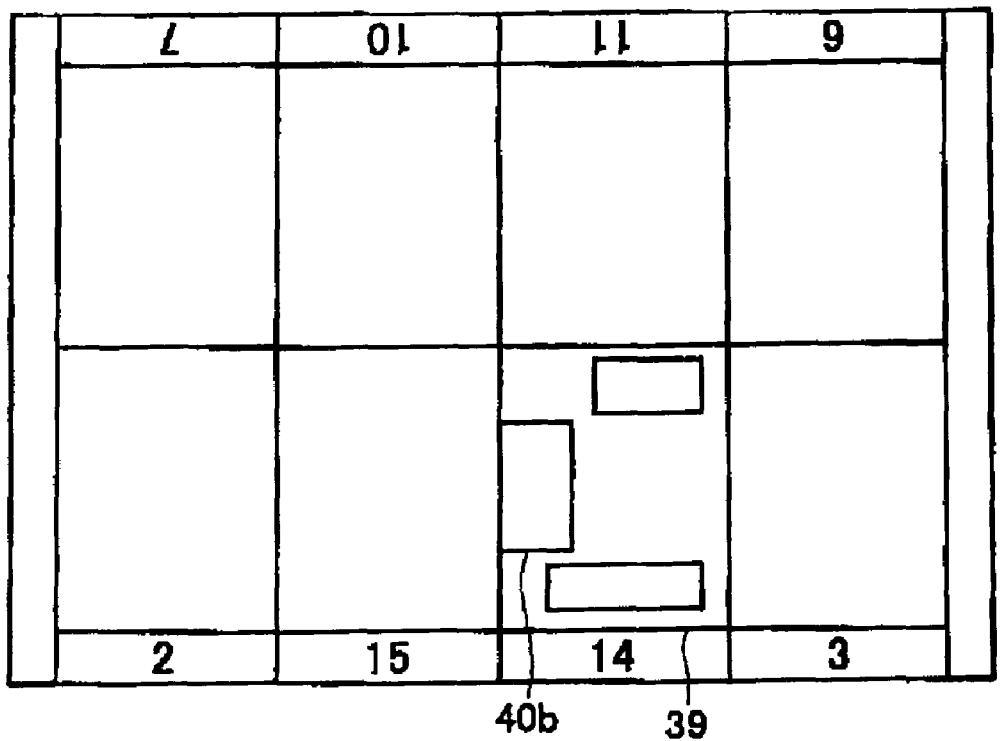

The link process and imposition process in the editor 4 will be more fully understood from the following detailed description. FIG. 4 is a flowchart showing the imposition process in the imposition processor 20. FIG. 5 is a flowchart showing the link process in the link processor 11. FIG. 6 illustrates the link process on a screen. FIG. 7 illustrates page flipping after the link process in FIG. 6. FIG. 8 illustrates imposition data created in association with the link process.

First, in the editor 4 on the basis of the link information from the link processor 11, the image processor 9 accesses the database 30 to read out the data file of white page book. The data file of white page book has a display command in the book image and is previously stored in the database 30. Then, as shown in FIG. 6, it displays an image 34 of the book in a display window 33 within a screen region 32 of the display 1 (S10). The display window 33 is opened by the certain viewer application software that is added to the data file of white page book at the viewer adder 10. When the data file of white page book is read in the image processor 9, the imposition processor 20 reads data of a certain imposition form (vertical and horizontal composition of text and so forth) at the same time from the database 30. Then, it prepares imposition data 35, as shown in FIG. 8, which is developed in an inner memory (not depicted) in the editor 4 (S1). The imposition data 35 is employed to output an actual reproduction film and CTP, and thus has data quality identical to normal imposition data.

Next, an operator who intends to perform link operations using the publication producing system 50 employs the keyboard and mouse of the input unit 3 to perform input operations such as drag and drop. Through those input operations, as shown in FIG. 6, a variety of information can be linked on certain positions on a page in the book image 34, for example, displayed in a state of double-page spread (S11). The variety of information includes the thumbnail data for display input from the image converter 8, and information of character, still picture, motion picture and audio sent from other application software, for example. It is assumed in the book image 34 shown in FIG. 6 that a page spread on the left side is displayed as the 13the page 38 and another page spread on the right side is displayed as the 14th page 39.

Once the link process is performed at the step S11, th imposition processor 20 performs a page sorting to sort th imposition data 35 in page order of an actual book (S2). After the page sorting, the operator employs the input unit 3 to designat a type of the sheet for actually printing out and a color of the sheet (S3). Also in the steps S2 and S3 information regarding the number of total pages and a thickness of a sheet per pag can be obtained. From the above information and a finished styl of bookmaking result, an image size f a back c ver (a thickn ss of the book, a width of a binding margin and so forth) can be specified. In the next step, an image file with color information of covers is created from the specified data. The image file can be employed to perform layout and design of the upper cover, spine and back cover once again together (S4). After the process in the step S4, a reproduction size is designated and a pasted board of the book is selected in the next step (S5). Selection of the reproduction size and pasted board usually depends on a type and performance of the output device (print machine). Though, if the pasted board differs in types and so forth from one another, the number of pages per plate can be designated in the steps S3 and S4. After the step S4, an imposition process is performed to determine relations of front and rear surfaces of a sheet for print relative to respective printing directions and a detailed designation of paper folding is performed for cutting (S6). This determined a physical size per page and that of a plate including a margin on a printable region. If marginal information such as page numbers, thumb indexes, headline, marks, management page numbers and indexes are not contained in an image, a designation is made on a margin. As for the plate, designations are made on positions and sizes of color patches and on positions, types and shapes of register marks for cutting (S7). The steps S2-S7 are directed to parameter designation processes mainly in the imposition process.

Once the parameters for the imposition process are designated at the steps S2-S7 and the link process is performed at the step S11, the link processor 11 updates the data file of white page book (S12) and determines if the update is finished (S13). If it is determined that the update is finished, then the link process is terminated. To the contrary, if it is determined that the update is not finished, then the link processor 11 further determines if the link process is terminated based on the presence of input information from the input unit 3 (S14). If it is determined at this step that the link process is finished, then the link process is terminated similarly. To the contrary, if it is determined that the link process is not finished, then the link processor 11 performs a page flipping process to turn page(s) to a page before or behind the currently displayed page or to arbitrary page (S15). Thereafter, it repeats the link process from the step S11. in the link process, a preprocess for naming an be executed to previously give names in page order to files to be linked, for example, like "00001, 00002, 00003, . . . , 99999" and additionally with an ID mark "W" like "00008W" in the case of a double-page spread. This allows an automatic adding process, in which the data file of white page book in the link process can be automatically updated together without displaying them on the screen of the display 1. When any flies to input are not present more (finished), it is determined as a temporary halt to update and link. The temporary halt is performed to add a new file freely between pages also linked in name order or flowing the final page when a file to be freely added is generated after the link process. If the file with the same name is linked again, the old file is subjected to a replacement with a new file. The replaced old file is saved in another saving region (saving location) and the link processor 11 produces log information that designates the replacement occurred and outputs it to the editor 4. Similar to the above, if there are files desirable to delete, with an input of a list text file of their file names, they can be deleted together. In this case, similar to the replacement, logs and files are saved in different saving regions. After such the automatic adding process is finished, similar to a normal link process, a linked situation can be confirmed with free page flipping.

The page flipping performed in the step S15 is a process to display a turning page, as show in FIG. 7, in a book image 34 (in this case the 14the page 39). When an operator manipulates the mouse cursor 36 to hit (click) either one of arrow icons 37a and 37b displayed on the display window 33 (in this case the arrow icon 37a), the hit arrow icon 37a changes its display color. Then, information indicated by the direction of the hit arrow icon 37a is sent to the image processor 9 as the page flipping information. The page flipping information includes, information on a left/right side being indicated on a page; information on a key operation; and information on direct display of a page number to be opened and title of section. Through the page flipping operation, the operator can perform the link process in such a natural feeling that he/she links photos and so forth on an actual book. In addition, any pages can be displayed in a state of double-page spread. Therefore, arrangement situations that designate where a certain thing is linked to can be confirmed easily. As a result, the link operation can be easily performed in a reduced time without linking errors.

If it is determined at the step S13 or S14 that the link process is terminated without going to the page flipping operation at the step S15, the imposition processor 20 completes the imposition data 35 as shown in FIG. 8 (S6).

As described above, the link and imposition processes are performed in the link 11 and imposition 20 processors. Through these processes, when data for display (the second image data) is just linked to the white page data per page displayed in the book image 34, imposition data for use in actual printing can be created. In addition, the data 40 such as characters and images are linked to the 13the page and the 14the page 39 in the book image 34 so as to cross over both pages as shown in FIG. 6, for example. On the imposition data 35 developed in the inner memory of the imposition processor 20, the data 40 are divided in and linked to both pages 38 and 39 that overlap a cutting line as shown in FIG. 8. In this example, since the white page data is defined independently per page, if a page is added to or deleted from the book image 34 to increase or decrease the white page data, the imposition data 35 can be created precisely with high efficient publication production.

Figure 9:
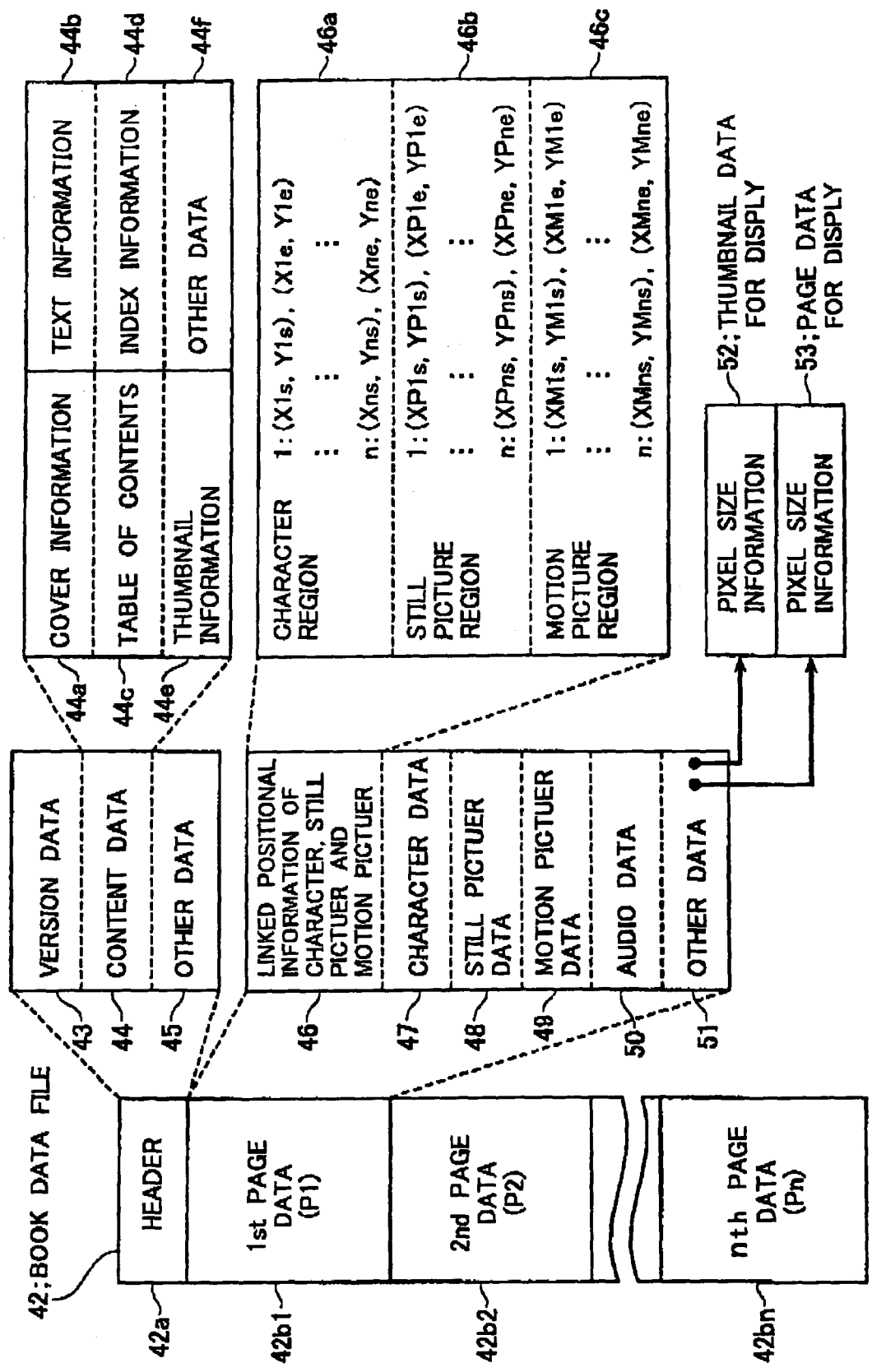
FIG. 9 illustrates a configuration of a book data file that configures a publication to be displayed in the form of a book.

FIG. 9 illustrates a configuration of a book data file that configures a publication to be displayed in the form of a book. This book data file is completed through the link process performed to the white page book described above. As shown in FIG. 9, the entire book data file 42 is configured to include a header 42a that is a topic head of the file and each page data 42b1-42bn of the white data. The header 42a is employed the store version data 43 indicating a version of the file; content data 44 indicating contents of the book data file 42; and other data 45 indicating various control information and so forth. The content data 44 indicating contents of the book data file 42 is employed to store cover information 44a for determining the upper and back covers of the publication: text information 44b indicating detailed information such as positions and contents of linked data per page; table-of-contents information 44c linked to the text information 44b with a flag added to page data of white page per page to indicate a table of contents; index information 44d produced on the basis of the table-of-contents information 44c and text information 44b; thumbnail information 44e for storing management information corresponding to each page of thumbnail produced additionally; and other data 44f.

On the other hand, the page data 42bl-42bn are employed to store linked positional information 46 for storing positional coordinate data 46a-46c of regions linked to characters, still pictures and motion pictures; character data 47 in the form of text and the like; still picture data 48 in the form of JPEG and the like; motion picture data 49 in the form of MPEG (Moving Picture Experts Group) and the like; audio data 50 in the form of MP3 (MPEG Music Layer 3) and the like; and other data 51. Other data 51 is employed to store pixel size information and so forth of thumbnail data for display 52 and page data for display 53. Thus, the book data file 42 with linked positional information 46 and so forth per page data 42bl-42bn is configured. Accordingly, the imposition processor 20 can produce the imposition data 35 per page. In addition, it appropriately processes the linked data 40 split over a double-page spread on the white page book so that each half the split data can be accommodated in each page.

The book data file 42 can be read from various PCs and the like because the viewer adder 10 adds the certain viewer application software to the book data file 42 as described above. It can be considered that the raster image data produced for general publications have too small characters to identify when they are displayed in a book image as such on a display in the PC. Therefore, the viewer application software preferably has a function of enlarging a part. According to this function, when an operator indicates an area to enlarge in the book image using the pointing device, an enlarged image of the indicated area is superimposed on the book image. The second image data may be enlarged as such to display or linked to a third image data previously created for enlarged display. The book data file 42 completed and stored in a rewritable storage medium can be reedited at the editor 4 (for example, the link process and imposition process). Therefore, page data can be easily added to and deleted from the book data file. The book data file 42 may be delivered via a network such as the Internet suitably from a server in response to a request from the user. Preferably, the viewer application software may also be delivered suitably from the server in response to the request from the user.

Figure 10:
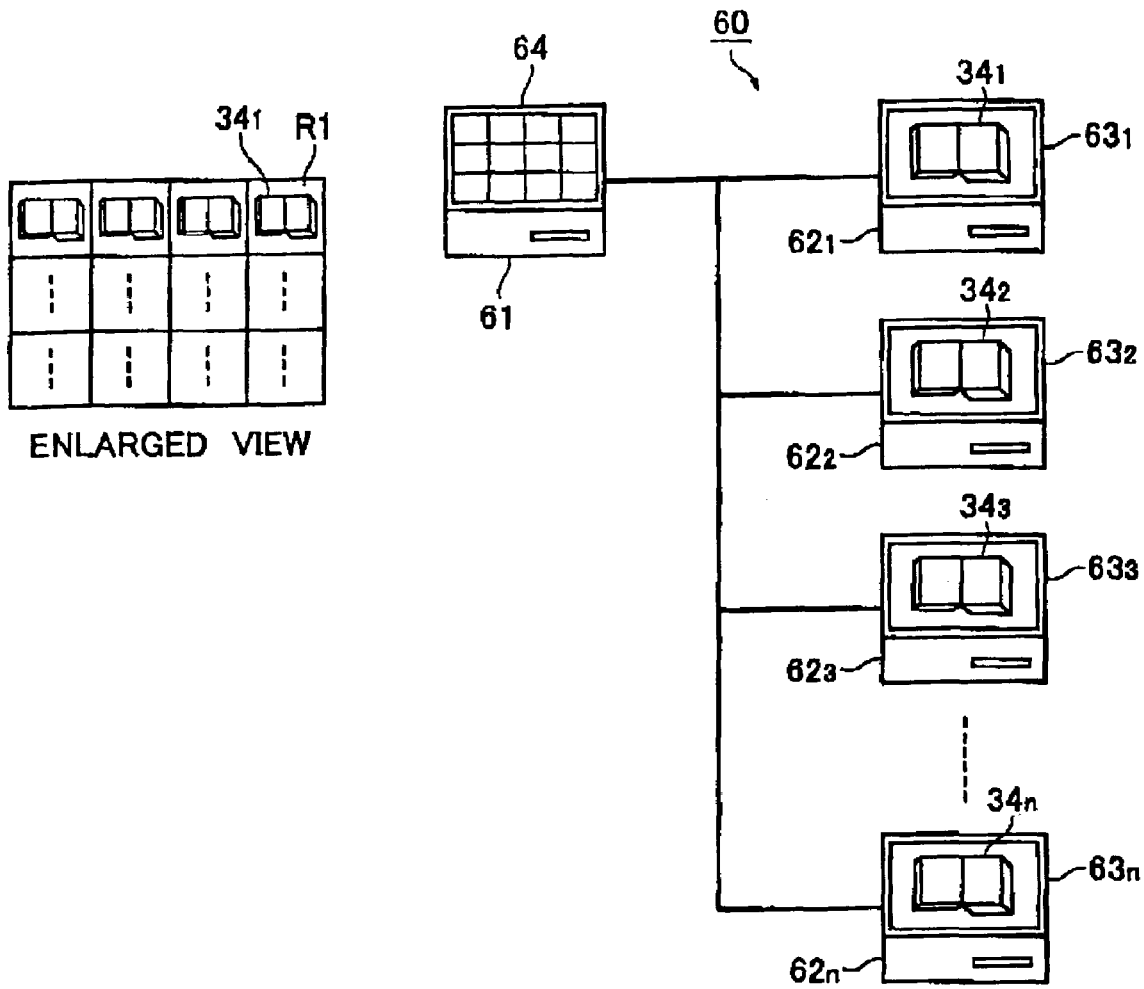
FIG. 10 is a block diagram showing a network system according to an embodiment of the present invention.

A network system using the electronic publication data will be described next. FIG. 10 is a block diagram showing an arrangement of a network system according to an embodiment of the present invention. The network system 60 includes one host computer (hereinafter referred to as "HPC") 61 and a plurality of client computers (hereinafter referred to as "CPC") $62_1$-$62_n$. These computers are connected via a communication line such as a LAN cable and the Internet or an on-demand data broadcasting by TV. The HPC may be arranged more that one. The HPC 61 and CPC $62_1$-$62_n$ can previously read the publication data (book data file) produced in the above-mentioned editor 4 and the certain communication software for bidirectional communication in various systems. Display devices $63_1$-$63_n$ in the CPCs $62_1$-$62_n$ can display the book images $34_1$-$34_n$ on respective screens thereof. The displayed book images $34_1$-$34_n$ are transmitted from the CPCs $62_1$-$62_n$ to the HPC 61 to synchronize them. The HPC 61 reduces the received book images $34_1$-$34_n$ into predetermined sizes and displays them in a line at given locations on a screen in a display device 64. The book images $34_1$-$34_n$ are displayed in the form of an actual book. This is considered as a most general, familiar and optimum user interface (hereinafter referred to as "UI/F") that gives orientations on data displayed on the screen with a limited area.

As described above, the HPC 61 is synchronized with the CPCS $62_1$-$62_n$ on transmission and reception of the page data in the book data files (book images $34_1$-$34_n$). Therefore, when a page flipping operation is performed at the CPC $62_1$ to turn a page in the book image $34_1$, for example, the reduced book image $34_1$ displayed on a display region R1 for the CPC $62_1$ on the screen in the HPC 61 is turned simultaneously in a similar page flipping operation. To the contrary, when a page flipping, operation is performed at the HPC 61 selectively indicating the book images $34_1$-$34_n$ displayed in the display regions for the CPCs $62_1$-$62_n$, in synchronization with the page flipping, the selected one of the book images $34_1$-$34_n$ displayed on the screens at the CPCs $62_1$-$62_n$ is turned simultaneously in a similar page flipping operation. The central control (management) is not limited in the above system. For example, there is a system for accumulating display information in the HPC and, in response to a request from a CPC, transferring display data from the HPC to the CFC, which manages it. There is another data management system for installing data in the HPC and, after a connection with a CPC is established, similarly installing the data in the CPC from the HPC manually or automatically. There is different system for installing data each in the HPC and the CPC. These systems can be selected for practical use.

Figure 14A:
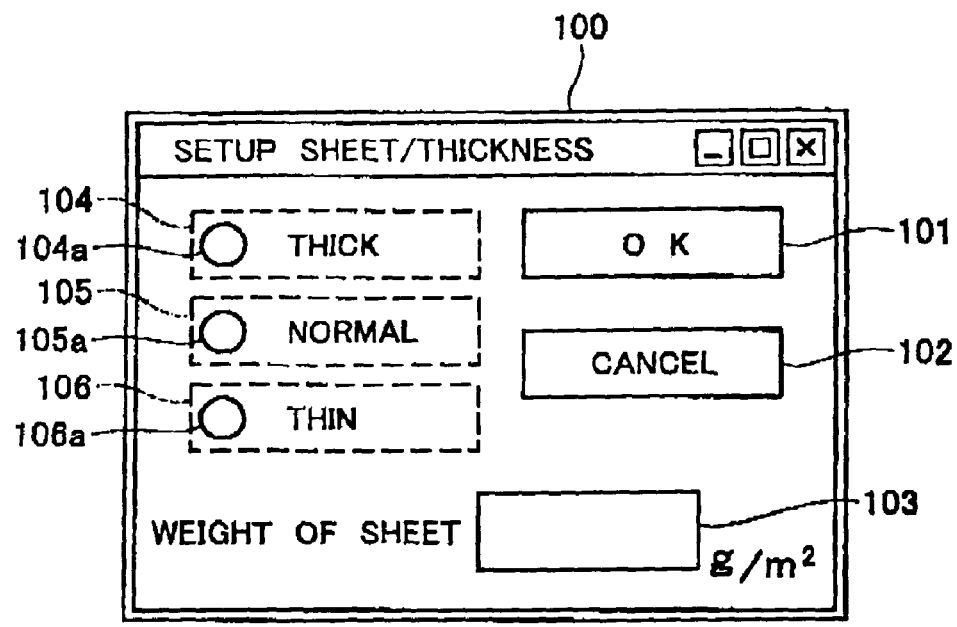
FIG. 14A illustrates a setup screen with regard to display of page flipping.
Figure 14B:
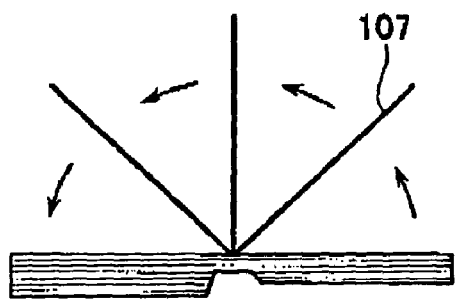
FIG. 14B illustrates an example of page flipping.
Figure 14C:
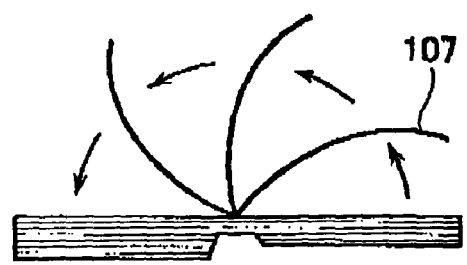
FIG. 14C illustrates another example of page flipping.

As for the page flipping operation, pointing devices such as the mouse may be employed as described above. Though, input devices such as touch panels may be applied to the display devices $63_1$-$63_n$ and 64 to perform such the page flipping further easily, giving specially improved operability to the HPC 61 and CPCs $62_1$-$62_n$. Therefore, such the network system may be applied in school teachings that employ textbooks for learning (book data files) produced by the method described above. In addition, a teacher uses the HPC 61 and each student uses respectiv CPCs $62_1$-$62_n$, for example. In this case, the teacher can give instructions on learning to the students while the teacher is possible to central control each student and to adjust a progress of each student on learning the textbook. When the publication thus produced is applied to a network system constructed from a predetermined structure, central control of a plurality of terminal equipment (each CPC) by one HPC and simultaneous bi-directional transmissions (information transfer) between a plurality of terminal equipment and one HPC can be performed. As for display of page flipping, as shown in 14A, for example, with a "sheet/thickness" setup dialog box (hereinafter referred to as "setup DB") 100 displayed on the screen in the display device 1, a thickness of a sheet in the box image can be instructed from the screen. The setup DB 100 includes command buttons 101-102 for defining decision and cancellation of inputs. An input box 103 for setting a weight of a sheet, and selection boxes 104-106 for selecting a thickness of a sheet. When a check mark is attached on check boxes 104a-106a in the selection boxes 104-106 using the input unit 3 such as a mouse, the selection of a sheet thickness can be determined. For example, if "THICK" in the selection box 104 is selected, an image of page flipping in a transient state varies like a sheet 107 turns linearly as shown in FIG. 14B. On the other hand, if "THIN" in the selection box 106 in selected, an image of page flipping in a transient state varies like a sheet 107 turns describing a curve as shown in FIG. 14C. The image of page flipping in a transient state can also be varied through an automatic calculation if a weight of a sheet is set at the input box 103. As a result, it is possible the display an image of page flipping a book that has a highly pursued reality.

Figure 11:
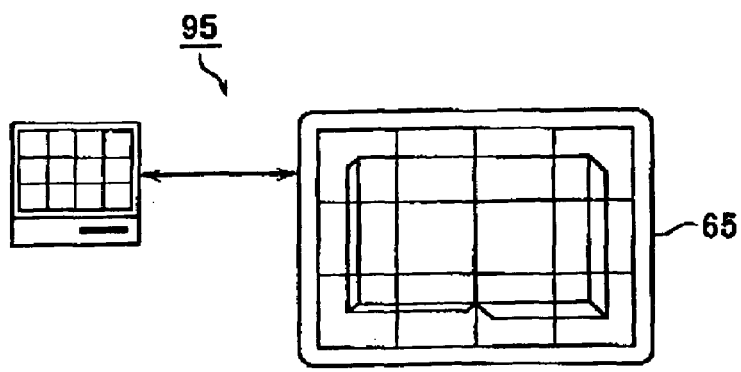
FIG. 11 shows an image of a synchronized display system using the network system.
Figure 12:
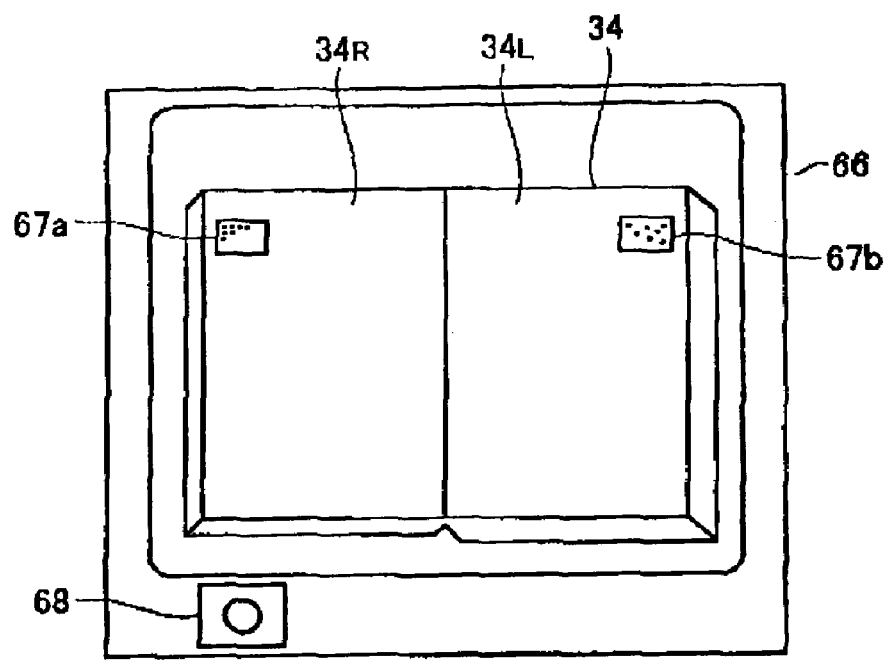
FIG. 12 shows an image of a guide system using the network system.

The central control (management) can be employed in advertisements with a plurality of large monitors (for example, ads at platforms in train stations and ads at department stores and underground markets) and in a total management for notice-sheds in addition to the teaching site described above. It may be also employed in a synchronized display system 95 for a large video with a plurality of monitors 65 as shown in FIG. 11 and in a guide system including a monitor 66 with a specification as shown in FIG. 12 (guide systems at airports and train stations). The monitor 66 shown in FIG. 12 includes seals of raised letters 67a, 67b arranged at certain positions on right and left pages $34_R$, $34_1$ in a double-page spread within a display region for th book image 34. It also includes an audio replay button 68 arranged on another certain position. Therefore, even a visually handicapped person can easily confirm the direction of the page flipping and understand the contents of the page from an audible guidance. Thus, a highly public guide system usable in wide people can be achieved.

Figure 13:
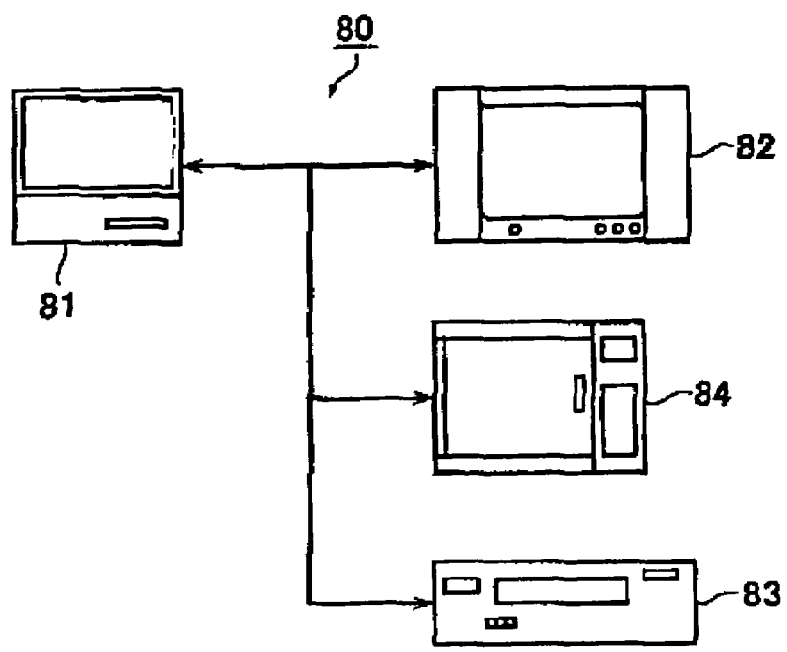
FIG. 13 is a block diagram showing an arrangement of another network system.

FIG. 13 is a block diagram showing an arrangement of another network system according to the present invention. This network system 80 includes one HPC 81 or more and, Instead of the CPCs $62_1$-$62_n$, it also includes, for example, a TV set 82, a VCR (Video Cassette Recorder) 83, a microwave oven 84 and a refrigerator (not shown). These household electrical products are connected through a network inside a computer such as USB, SCSI and inner bus; a communication line such as a LAN cable and the Internet; or a network system such as an on-demand data broadcasting system by TV and the like. The HPC 81 contains a storage medium such as a CD-ROM set therein to store manuals each produced as an electronic publication by the present invention for a household electrical product. To these manuals, in addition to character information, image information and audio information, command information for the household electrical products are linked. On a monitor screen of the HPC 81 in the network system 80, opening a page in interest from the manual of the household electrical product concerned, an operator can operate a command button associated with the item concerned. As a result, in relation to the household electrical product concerned, a command can be sent from the HPC 81 for programming the TV set 82 or VCR 38 or for setting successive operations in accordance with the contents of a recipe for use in the microwave oven 84. Thus, the household electrical products 82-84, which are set and controlled individually, can be set and controlled in central. Not only the household electrical products 82-84, it is possible to set a destination for a car navigator (not shown) that takes part in the network system 80 via a radio from a communication satellite or a wireless mobile communication. For example, viewing image data of a pamphlet for travel guide on the screen of the HPC 81 as an electronic publication that is recorded in the recording medium, an operator can give an instruction to the screen from a pointing device and the like. Then, the destination set information that is linked to the image data of the pamphlet for travel guide is sent to the car navigator from the HPC 81 to set the destination. Thus, through the electronic publication, the HPC 81 can control a plurality of household electrical products as well as devices that take part in the network system 80. Accordingly, such a UI/F can be achieved that allows one host to perform all settings that have been individually performed by each instrument and device.

As obvious from the forgoing, there is an effect according to the present invention. Because it is possible to link not only raster image data but also character, still picture, motion picture and audio information to each page of images displayed in the form of an actual publication. It is also possible to create imposition data at the same time. Therefore, the link process can be simplified. For example, it is possible to easily confirm a situation of link data arranged in a state of double-page spread and to easily link an image and so forth crossing over a double-page spread. When a link process is performed to a page, an imposition process per page is performed at the same time. Therefore, a publication can be produced in a reduced operation, and thus errors and costs for production of publications can be reduced. Accordingly, the link data and imposition data created in the production process of the publication can be employed to produce another publication with an effective use of data and a suppressed publication production cost.

There is another effect according to the present invention. Because, when an electronic publication is employed among those publications in a network system, for example, host and client computers, which display images of the publication, can mutually transfer page information of the publication via the network using any protocol. The host computer can display, based on the transferred page information, the images of the pages in the publications displayed or to be displayed on a plurality of client computers, in a manner of reduced and arranged in a line. Therefore, one or more host computers can communicate with a plurality of client computers in a bi-directional mode at the same time. In addition, the one or more host computers can control and confirm the plurality of client computers at the same time.

The invention claimed is:

1. A method of producing a publication by superimposing multimedia data on a plurality of page images, the method comprising:
    displaying a first display page image, the first display page image being one of a white page image or a formatted page image;
    the white page image being capable of being linked to a data file to form a formatted page image of the publication and the data file including raster image data;
    creating an imposition data for the white page image based on the data file, the imposition data being based on stored data and parameters related to forming the formatted page image of the publication;
    reading the raster image data for the first display page image;
    selecting a second display page image through an image transformation process on the basis of screen transit operation information;
    linking the raster image data, on the basis of an input operation using an input unit, to a designated area on the second display page image through the input operation;
    superimposing the raster image data linked to a designated area on the second display page image;
    arranging the first display page image to exclude the raster image data linked to a designated area on the second display page image;
    linking at least one of motion picture information, audio information and command information relating to the raster image data, to the formatted page image;
    producing an electronic publication by associating the formatted page image to at least one of motion picture information, audio information and command information linked to the page image.

2. The method of producing publications according to claim 1, wherein the screen transit operation information includes page flipping information and the image transformation process includes a page flipping process.

3. The method of producing publications according to claim 1, wherein the raster image data includes raster image data outputted from a raster image processor in a press process.

4. The method of producing publications according to claim 1, wherein the raster image data includes a first image data having a first resolution and a second image data to be linked thereto, said second image data having a second resolution that is different from the first resolution; and wherein the superimposed raster image data includes the second image data.

5. The method of producing publications according to claim 4, further comprising: producing a printed publication using the first image data.

6. The method of producing publications according to claim 4, further comprising:

creating a data file for reproduction using the first image data on the basis of the imposition data.

7. The method of producing publications according to claim 6, further comprising:

creating printing process information while creating the imposition data; and creating a file for printing process management from the printing process information created.

8. The method of producing publications according to claim 1, further comprising: reading at least one of motion picture information, audio information and command information to be linked to the publication.

9. The method of producing publications according to claim 1, further comprising: recording the electronic publication along with a viewer program for displaying the electronic publication in a storage medium.

10. The method of producing publications according to claim 1, wherein the raster image data is derived from a page description language file created on the basis of text data in an original and converted by a raster image processor, said method further comprising:

creating converted text data through an OCR process to the raster image data; and comparing the converted text data, an original page description language file of the raster image data and the text data of said original to correct conversion errors from the OCR process, obtaining disposal information of each character in said raster image data, and comparing differences between raster image data of a first revise and a second revise from the disposal information to check digital data.

11. A medium having a program recorded therein for executing a method of producing publications according to claim 1.

12. A method of displaying, comprising:

displaying an image of an electronic publication obtained from execution of a method of producing publications according to claim 1; and applying an image transformation process to said image on the basis of screen transit operation information.

13. A method of displaying, comprising:

displaying an image of an electronic publication obtained from execution of a method of producing a publication according to claim 1; and varying the image with a simulation of page flipping corresponding to a sheet thickness of said publication on the basis of said page flipping information.

14. A method of displaying, comprising:

displaying an image of an electronic publication obtained from execution of a method of producing a publication according to claim 1;

designating an area to be enlarged and displayed within said image of said publication displayed; and enlarging and displaying the image in the designated area.

15. A network system comprising one or more host computer(s) and a plurality of client computers, connected to each other via a network, for loading from a storage medium an electronic publication produced by a method of producing publications according to claim 1, and displaying an image of said publication having raster image data linked to each page, wherein said host computer(s) and said client computers via said network mutually transfer information of a page in said publication displayed or to be displayed at said client computers, and wherein said host computer(s) reduces and displays an image of said page in said publication displayed or to be displayed at said client computers in a line.

16. A method of delivering a publication, comprising:

delivering an electronic publication produced according to the method of claim 1.

17. A method of producing a publication, comprising:

generating imposition information for the publication to be produced;

displaying a first display page image, the first display page image being a white page image or a formatted page image;

the white page image being capable of being linked to a data file to form a formatted page image of the publication and the data file including raster image data;

reading raster image data for the first display page image;

selecting a second display page image through an image transformation process on the basis of screen transit operation information;

linking the raster image data, on the basis of an input operation using an input unit, to a designated area on the second display page image through the input operation;

superimposing the raster image data linked to a designated area on the second display page image;

updating the imposition information for the first and second display page image based upon the raster image data superimposed on the second display page image;

linking at least one of motion picture information, audio information and command information relating to the raster image data, to the formatted page image;

producing an electronic publication by associating the page image with the the formatted page image to at least one of motion picture information, audio information and command information linked to the page image.

18. The method of producing a publication according to claim 17, further comprising:

creating a data file for use in printing the publication based upon the superimposed raster image data and the imposition information.

19. The method of producing a publication according to claim 18, further comprising:

creating printing process information while creating the imposition information; and creating a file for printing process management from the printing process information created.

* * * * *